(12) United States Patent
Mueller et al.

(10) Patent No.: US 7,980,072 B2
(45) Date of Patent: Jul. 19, 2011

(54) APPARATUS AND METHOD FOR ENERGY RECOVERY

(75) Inventors: Matthias Mueller, Neusaess (DE); Peter Schmuttermair, Gessertshausen (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 12/482,895

(22) Filed: Jun. 11, 2009

(65) Prior Publication Data

US 2009/0301073 A1     Dec. 10, 2009

Related U.S. Application Data

(63) Continuation of application No. PCT/EP2007/010817, filed on Dec. 11, 2007.

(30) Foreign Application Priority Data

Dec. 11, 2006 (DE) .................. 10 2006 058 357

(51) Int. Cl.
    *F16D 31/02*     (2006.01)
(52) U.S. Cl. .................................. 60/413; 60/414
(58) Field of Classification Search ............ 60/327, 60/413, 414
See application file for complete search history.

(56) References Cited

U.S. PATENT DOCUMENTS

| | | | | |
|---|---|---|---|---|
| 7,147,239 B2 * | 12/2006 | Teslak et al. | ..................... | 60/414 |
| 7,526,919 B2 | 5/2009 | Dreher et al. | | |
| 2006/0108860 A1 | 5/2006 | Stragier | | |

FOREIGN PATENT DOCUMENTS

| | | |
|---|---|---|
| DE | 29 31 681 A1 | 2/1981 |
| DE | 30 28 847 A1 | 3/1982 |
| DE | 10 2004 043 897 A1 | 9/2005 |
| EP | 0 075 035 A1 | 3/1983 |

\* cited by examiner

*Primary Examiner* — Michael Leslie
(74) *Attorney, Agent, or Firm* — Muncy, Geissler, Olds & Lowe, PLLC

(57) ABSTRACT

An apparatus for energy recovery is provided. The apparatus comprises a hydrostatic machine and at least one hydraulic storage component. The hydraulic storage component is connected to the hydrostatic machine via a working line. A valve device is provided for influencing the volumetric flow in the working line between the hydraulic storage component and the hydrostatic machine. The valve device comprises a brake pressure regulating valve unit with a valve and a pilot valve unit which acts on the valve with a control pressure. The invention also relates to a method for controlling the apparatus for energy recovery. In order to store released energy, a required braking torque is determined by a control electronics system. The volume from the hydrostatic piston machine into the working line is increased and the pilot valve is actuated by the control electronics system such that the valve is moved towards its open position.

25 Claims, 2 Drawing Sheets

APPARATUS AND METHOD FOR ENERGY RECOVERY

This nonprovisional application is a continuation of International Application No. PCT/EP2007/010817, which was filed on Dec. 11, 2007, and which claims priority to German Patent Application No. DE 10 2006 058 357, which was filed in Germany on Dec. 11, 2006, and which are both herein incorporated by reference.

BACKGROUND OF THE INVENTION

1. Field of the Invention

The present invention relates to a method and a device for energy recovery having a hydrostatic engine, at least one hydraulic store, which is connected to the hydrostatic engine via an operating line, and having a valve device which influences a volume flow rate in the operating line between the hydraulic store and the hydrostatic engine.

2. Description of the Background Art

DE 10 2004 043 897 A1, which corresponds to U.S. Pat. No. 7,526,919, discloses a device for recovering kinetic energy which is released during a braking operation. The device has a hydrostatic engine which is connected to a storage element by means of an operating line. A valve device is arranged in this operating line. This valve device is constructed as a switching valve and can be switched between a connecting and a separating switching position. Consequently, it is possible to uncouple the hydraulic store from the hydrostatic engine and consequently to prevent unintentional discharging and consequently a loss of the recoverable energy. The hydrostatic engine can be connected by means of a coupling device to a drive chain, for example, of a vehicle.

In the prior art system, it is disadvantageous for only complete decoupling or an unthrottled connection to be possible between the hydrostatic engine and the hydraulic store. Therefore, it is only possible to influence the hydrostatic braking by the hydrostatic engine by adjusting the hydrostatic engine itself. The possibilities for application and expansion of a hydrostatic travel drive are consequently limited owing to a lack of flexibility.

SUMMARY OF THE INVENTION

It is therefore an object of the present invention to provide a method and a device for recovering energy which is improved with respect to the expansion possibilities thereof.

The device according to an embodiment of the invention for recovering energy has a hydrostatic engine and at least one hydraulic store. The hydrostatic engine can be connected to the hydraulic store via an operating line. A valve device which influences a volume flow rate between the hydraulic store and the hydrostatic engine can be arranged in the operating line. According to the invention, this valve device has a brake pressure regulation valve unit having a valve and a pilot valve unit, which produces a control pressure which acts on the valve. Consequently, not only is it possible to connect the store to the hydrostatic engine in an unthrottled manner in order to store the energy but also it is further possible to influence the resistance with respect to the hydrostatic engine. To this end, the valve is acted on with a control pressure which is adjusted by a pilot valve unit. Owing to this control pressure, the valve can also be moved into intermediate throttling positions. Consequently, for example, during a braking operation, part of the energy is converted into heat and another part of the kinetic energy to be dissipated is stored in the hydraulic store in the form of pressure energy.

In contrast to the a conventional system for energy recovery, it is possible, even when the braking power is not sufficient owing to the charging operation of the hydraulic store, for example, to brake a vehicle using the energy recovery device. Owing to the throttle action at the valve, the braking action is greater than if only pressure medium were to be conveyed by the hydrostatic engine counter to the storage pressure.

The valve device can also have a discharge valve unit. The discharge valve unit can have an additional valve. This additional valve can be arranged in an operating line branch that connects the operating line to the tank space. The additional valve can be acted on with an additional control pressure. The additional discharge valve unit, by bypassing the first valve and the store that is connected thereto, allows conveying from the hydrostatic engine directly into the tank space. Consequently, it is possible to produce, for example, a cooling circuit in which a pressure medium is drawn by the hydrostatic engine from the tank space and is conveyed back into the tank space via the discharge valve unit. A cooler can be arranged in the operating line branch. At least one valve may be constructed, for example, as a seat valve. For the following example configurations, it will be assumed that both valves are constructed as seat valves.

The additional seat valve can be acted on with the additional control pressure via an additional control pressure line. The additional control pressure line can be connected to the tank space by a storage pressure limitation valve. Owing to this storage pressure limitation valve, if a hydraulic store is completely charged the additional seat valve can be automatically moved toward a direction of the open position thereof and consequently the pressure medium is conveyed from the operating line back into the tank space.

Furthermore, the additional control pressure line can be connected to the tank space via a relief valve. Consequently, the additional control pressure line can be depressurised into the tank space, whereby the additional seat valve moves into the open position thereof. Regardless of reaching a maximum permissible pressure in the hydraulic store, pressure medium can consequently be conveyed by the hydrostatic engine directly into the tank space with the hydraulic store being bypassed. This allows the cooling circuit to be used separately and independently of the respective operating state or the charging state of the hydraulic store.

According to another embodiment, the seat valve can be connected to a control pressure line. The pilot valve unit comprises at least one control pressure regulation valve, by means of which the control pressure line can be connected to the tank space. Using this control pressure regulation valve, the seat valve can be moved into a throttling intermediate position. This intermediate position is dependent on the control pressure adjusted by the control pressure regulation valve in the control pressure line.

The pilot valve unit can additionally have a switching valve, by means of which the control pressure regulation valve can be separated from the control pressure line.

Furthermore, the pilot valve unit and/or the discharge valve can be connected to an electronic control system. Using this electronic control system, it is then possible to establish the respective state of the system and in particular the energy recovery device and the individual operating possibilities of the energy recovery device can be controlled in a selective manner.

Furthermore, sensors can be provided in order to establish the control pressure and/or the additional control pressure and/or a pressure in the operating line branch. These sensors can be connectable to the electronic control system. Based on the measured pressure values in the individual portions of the device, the electronic control system establishes the current operating situation in each case and controls the actuators of the valves.

Furthermore, a temperature sensor can be provided for establishing a temperature of the pressure medium in the tank space. Such a temperature sensor can also be connected to the electronic control system. If, for example, the temperature in the tank space exceeds a critical value, the cooling circuit is switched on and the hydrostatic engine conveys pressure medium back into the tank space via the operating line branch even without storing kinetic energy which is released in the hydraulic store. The cooling action can be increased by a cooler additionally being arranged in the operating line branch.

Furthermore, the hydrostatic engine can be configured so as to be able to be connected to a drive train via a coupling, which is connected to the hydrostatic engine. Consequently, the device according to the invention can be connected to the drive train if necessary. If energy recovery is as unnecessary as a cooling or a braking action by the energy recovery device, the coupling can be separated and the drive operates in an almost loss-free manner with respect to the energy recovery device.

Furthermore, the hydrostatic engine could be an adjustable piston engine which, in a neutral position thereof, is adjusted to a working volume which is not equal to zero. Consequently, when the hydrostatic engine is coupled to a drive train, there is in any case produced a pressure which is sufficient thereby to actuate adjustment elements, for example, in order to activate coupling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
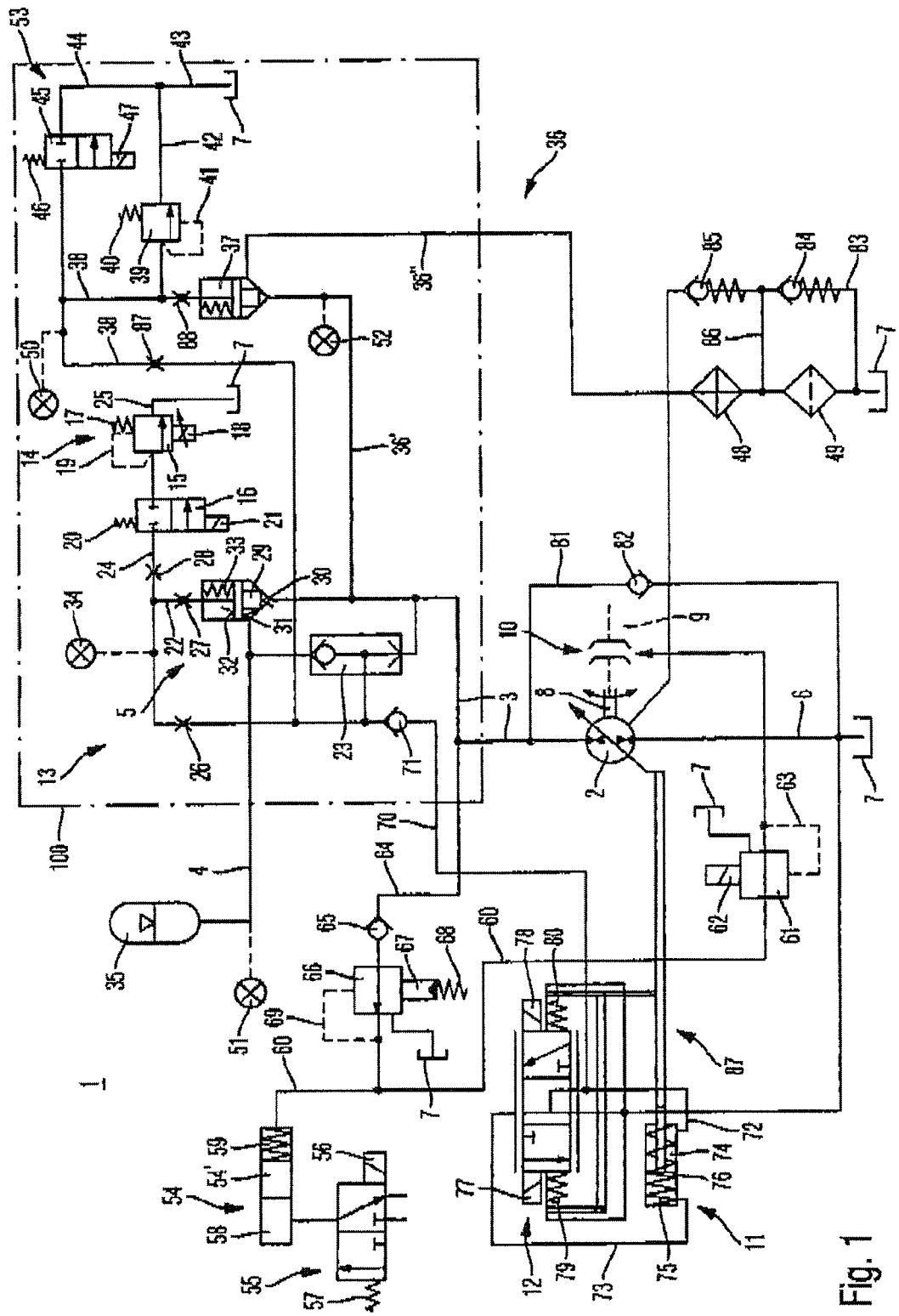
FIG. 1 is a hydraulic circuit diagram of a device according to an embodiment of the invention.

FIG. 1 illustrates a device 1 according to an exemplary embodiment of the invention for recovering kinetic energy which is released, for example, when a vehicle is braked. However, the device 1 is suitable for all drives and is not limited to travel drives. For example, the device can also be used together with a lifting device of a crane or a rotating mechanism of a digger.

The device has a hydrostatic engine which is constructed as an adjustable hydrostatic piston engine 2 in the embodiment illustrated. The adjustable hydrostatic piston engine 2 can be used both as a pump and as a motor. The hydrostatic piston engine 2 is connected to an operating line 3. The operating line 3 is connected to a storage line 4. The storage line 4 opens in a hydraulic store 35. The hydraulic store 35 can be a hydropneumatic high-pressure store. A seat valve 5 is provided between a connection of the operating line 3 to the storage line 4. Via the seat valve 5, the operating line 3 is connected to the storage line 4, the connection being interrupted in the closed position of the seat valve 5. Depending on the seat valve 5 being controlled with an adjustable control pressure, a throttled connection between the operating line 3 and the storage line 4 is produced.

Another connection of the hydrostatic piston engine 2 is connected to a tank space 7 by means of a tank line 6. If the hydrostatic piston engine 2 is connected to a drive train 9 of a vehicle by means of the drive shaft 8 thereof and is driven, for example, owing to the mass inertia of a vehicle which is in coating operation, pressure medium is drawn from the tank space 7 via the tank line 6 by means of the hydrostatic piston engine 2. The hydrostatic piston engine 2, in accordance with the adjusted supply volume thereof, conveys pressure medium into the operating line 3 and, from there, via the seat valve 5 and the storage line 4, into the hydraulic store 35.

In order to recover the energy, the hydrostatic piston engine 2 is operated as a motor and is connected to the drive train 9. The hydrostatic piston engine 2 is then acted on from the hydraulic store 35 with the pressure medium which is stored in a pressurised state therein via the storage line 4, the seat valve 5 and the operating line 3. The pressure medium is depressurised via the hydrostatic piston engine 2 into the tank line 6 and consequently into the tank space 7. A rotational torque is thereby produced by the hydrostatic piston engine 2 at the drive shaft 8 and is transmitted via a coupling 10 to the drive train 9 which is indicated only schematically. Owing to a connection of the device 1 to the drive train 9 via the coupling 10, kinetic energy which is released during deceleration, for example, of a vehicle, can consequently be converted into pressure energy, stored and subsequently used again. The pressure energy is stored in the hydraulic store 35. The pressure energy is available again for a subsequent acceleration operation. The pressure energy is converted via the hydrostatic piston engine 2 into a rotational torque which is transmitted via the drive shaft 8 to the drive train 9.

As already explained, the hydrostatic piston engine 2 can be adjusted in terms of its supply volume. To this end, it is connected to an adjustment device 11. The adjustment device 11 is acted on with an adjustable adjustment pressure by means of an adjustment pressure regulation valve 12. The co-operation of the adjustment pressure regulation valve 12 with the adjustment device 11 is explained further below.

The function of the hydrostatic piston engine 2 and its connection to the hydraulic store 35 is controlled by means of a valve device 100. The valve device 100 comprises a brake pressure regulation valve unit 13. The brake pressure regulation valve unit 13 itself comprises a pilot valve unit 14 and the seat valve 5 set out above. Owing to the pilot valve unit 14, a control pressure is adjusted in a control pressure line 22 in accordance with the level. The seat valve 5 is acted on with this adjustable control pressure in a closing direction. Consequently, the seat valve 5 can be adjusted in a stepless manner between a completely closed position and an unthrottled connection of the operating line 3 to the storage line 4.

The pilot valve unit 14 comprises a control pressure regulation valve 15 and a switching valve 16. The control pressure regulation valve 15 is retained in the closed position thereof by means of a control pressure regulation valve spring 17. In the opposite direction, the control pressure regulation valve 15 can be acted on with an adjustable force by means of a control magnet 18. The control pressure regulation valve 15 can be acted on with a hydraulic force in the same direction as the force of the valve spring 17. This hydraulic force is supplied to a hydraulic measuring surface-area on the control pressure regulation valve 15 by means of a first measuring line 19.

Owing to the control pressure regulation valve 15, the control pressure line 22 is depressurised into the tank space 7 when the control pressure regulation valve 15 is open. To this end, the control pressure regulation valve 15 is connected to the tank space 7 by means of a depressurisation line 25. The switching valve 16 is arranged upstream of the control pressure regulation valve 15. The switching valve 16 is located in the rest position thereof in the closed position illustrated in FIG. 1. It is retained in the rest position by means of a switching valve spring 20. In the opposite direction to the force of the switching valve spring 20, a switching magnet 21 acts on the switching valve 16 in the direction of the opened switching position. The switching magnet 21 and the control magnet 18 are controlled by means of an electronic control system in a manner which will be described below.

The switching valve 16 is arranged upstream of the control pressure regulation valve 15 in a control line 24 which connects the control pressure line 22 to the inlet side of the control pressure regulation valve 15.

The control pressure in the control pressure line 22 is supplied via a shuttle valve 23 from either the storage line 4 or the operating line 3.

To this end, the shuttle valve 23 is connected at both the inlets thereof to the operating line 3 or the storage line 4. An outlet of the shuttle valve 23 is connected to the control pressure line 22. A first throttle location 26 is formed in the control pressure line 22. In order to prevent excessively high volume flow rates for the pilot valve unit, a flow regulator may also be provided in place of the throttle location 26. A second throttle location 27 is constructed in the control pressure line 22 adjacent to the seat valve 5.

Between the first throttle location 26 and the second throttle location 27, the control line 25 branches off from the control pressure line 22. Between the location at which the control line 24 is connected to the control pressure line 22 and the switching valve 16, a third throttle location 28 is constructed in the control line 24.

The control pressure which is present in the control pressure line 22 and which can be adjusted by means of the control pressure regulation valve 15 acts on a valve piston of the seat valve 5. The valve piston is acted on in an opening direction at a first piston face 30 by means of the pressure in the operating line 3. At a second piston face 31, the valve piston is acted on by the pressure in the storage line 4 and consequently the storage pressure in the hydraulic store 35. Both pressures at the first piston face 30 and at the second piston face 31 act on the valve piston in the same direction.

The valve piston co-operates with a seal seat in such a manner that, when the seat valve 5 is in the closed position, the operating line 3 is separated from the storage line 4. The seat valve 5 is acted on with a closure force in the direction of the closed position thereof by means of a valve spring 33. In the same direction as the closure force of the valve spring 33, the control pressure which is supplied by means of the control pressure line 22 acts on the valve piston at a third piston face 32. If the switching valve 16 is now moved into the open position thereof, the control pressure of the control pressure line 22 is adjusted by means of the control pressure regulation valve 15. To this end, the control pressure line 22 is depressurised in the direction towards the tank space 7 via the control line 24 and the depressurisation line 25. Consequently, owing to the throttle locations 26, 27 and 28, a control pressure which can be adjusted by the control magnet 18 being acted on is produced at the third piston face 32.

In accordance with the action of a signal on the control magnet 18, the seat valve 5 can therefore be brought into a throttling intermediate position. If pressure medium is conveyed into the operating line 3 by the hydrostatic piston engine 2 during a braking operation, a drive train 9 which is connected to the device 1 according to the invention by means of the coupling 10 is braked with heat being produced owing to the throttle action at the seat valve 5. Furthermore, the hydraulic store 35 is pressurised at the same time by means of the storage line 4 and consequently a part of the kinetic energy released is stored in the hydraulic store 35 in the form of pressure energy.

In addition to the brake pressure regulation valve unit 13, the valve unit 100 also comprises a discharge valve unit 53. The discharge valve unit 53 comprises an additional seat valve 37. The additional seat valve 37 is arranged in an operating line branch 36. The operating line branch 36 connects the operating line 3 to the tank space 7. The additional seat valve 37 separates the operating line branch 36 into a first portion 36' and a second portion 36".

In the closed position thereof, the additional seat valve 37 separates the first portion 36' from the second portion 36". In this closed position of the additional seat valve 37, it is possible to store energy in the hydraulic store 35. In order to recover the energy from the charged hydraulic store 35, the control pressure line 22 and consequently the piston face 32 of the seat valve 5 are depressurised. The pressurised pressure medium of the hydraulic store 35 now drives the hydrostatic piston engine 2 and consequently ultimately the drive train 9 which is connected thereto by means of the coupling 10.

In order to prevent the formation of critically high pressure levels in the hydraulic store 35, the additional seat valve 37 is also constructed so as to be able to be controlled. To this end, an additional control pressure is adjusted in another control pressure line 38, by means of which pressure the additional seat valve 37 is retained in the closed position thereof during normal operation. However, if the pressure in the hydraulic store 35 increases to a critically high value, this additional control pressure is reduced by means of depressurisation of the additional control pressure line 38 into the tank space 7 and the additional seat valve 37 moves into the open position thereof. If the additional seat valve 37 is in the open position thereof, pressure medium conveyed by the hydrostatic piston engine 2 is discharged via the operating line branch 36 directly into the tank space 7. Further charging of the hydraulic store 35 is consequently prevented.

In order to adjust the additional control pressure for the additional seat valve 37 in the additional control pressure line 28, a storage pressure limitation valve 39 is provided. The storage pressure limitation valve 39 is retained in the closed position thereof during normal operation by means of a storage pressure limitation valve spring 40. The storage pressure limitation valve spring 40 is configured in such a manner that the storage pressure limitation valve 39 is moved in the direction of the open position thereof when the maximum charging state of the hydraulic store 35 is reached. Via an additional measuring line 41, the pressure present in the additional control pressure line 38 and acting at the inlet side of the storage pressure limitation valve 39 acts counter to the force of the storage pressure limitation valve spring 40. The additional control pressure line 38 connects the additional seat valve 37 to the outlet of the shuttle valve 23.

The additional control pressure line 38 is connected to an additional depressurisation line 43 via a first connection line 42. The additional depressurisation line 43 opens in the tank space 7. The storage pressure limitation valve 39 is arranged in the first connection line 42. If the storage pressure limitation valve 39 is activated and opens, the additional control pressure line 38 is consequently depressurised into the tank space 7 via the first connection line 42 and the depressurisation line 43. Consequently, the force acting in the closing direction on the piston of the additional seat valve 37 decreases. The seat valve 37 is moved in the direction of the opened position thereof and the pressure medium conveyed by the hydrostatic piston engine 2 is discharged into the tank space 7. A second connection line 44 is provided parallel with the storage pressure limitation valve 39 and the first connection line 42. In the second connection line 44, which also connects the second control pressure line 38 to the additional depressurisation line 43, an additional switching valve 45 is arranged. The additional switching valve 45 is retained in the rest position illustrated in FIG. 1 by means of an additional switching valve spring 46. In the rest position, the second connection line 44 is interrupted. By applying electrical power to an additional switching magnet 47, the additional switching valve 45 can be moved into a preferably unthrottled throughflow position, in which a through-connection is produced in the second connection line 44. Consequently, the control pressure in the additional control pressure line 38 can also be reduced by means of the additional switching valve 45. Accordingly, when electrical power is supplied to the additional switching magnet 47, the additional seat valve 37 is also moved into the opened position thereof.

Consequently, via the additional switching valve 45 which is also part of the discharge valve device 53, it is possible for pressure medium to be conveyed by the hydrostatic piston engine 2 directly into the tank space 7 regardless of the storage pressure in the hydraulic store 35.

In the additional control pressure line 38, a fourth throttle location 87 and a fifth throttle location 88 are arranged. The connection lines 42 and 44 are connected to the additional control pressure line 38 between the two throttle locations 87 and 88. As with the pressure limitation valve unit 13, the throttle locations 87, 88 serve to adjust a pressure drop in order to allow the additional seat valve 37 to open.

In order to allow cooling of the pressure medium not only via the operating line branch 36 itself, a cooler 48 is arranged in the second portion 36". If pressure medium is conveyed back into the tank space 7 by the hydrostatic piston engine 2 via the operating line 3 and the operating line branch 36, the pressure medium flows via the cooler 48. Consequently, when the temperature of the pressure medium increases, it is possible, by supplying electrical power to the additional switching magnet 47, to activate a cooling circuit which, by using the cooling power of the cooler 48, allows effective cooling of the pressure medium. In particular, high pressure medium temperatures can be reached if a vehicle braking operation is carried out by means of the seat valve 5. A high quantity of heat is produced at the seat valve 5 in the throttled position thereof. For example, after completing a braking operation, by supplying electrical power to the switching magnet 47, the pressure medium can be cooled to a low level again. In addition to the cooler 48, a filter 49 is provided downstream of the cooler 48.

Upstream of the cooler 48, a leakage line 89 opens in the second portion 36" of the operating line branch 36. Via the leakage line branch 89, leakage pressure medium is discharged from the hydrostatic piston engine 2 into the operating line branch 36 and consequently into the tank space 7. Generally, the leakage oil flow contains a large quantity of heat, for which reason the leakage oil line opens upstream of the cooler 48 in the operating line branch 36.

The device according to the invention is connected to the drive train 9 via the coupling 10 only when required. Generally, a connection between the drive shaft 8 and the drive train 9 is thus separated by means of the open coupling 10. In order to be able to close the coupling 10 when the system is in a pressure-free state, a pneumatic cylinder 54 is provided. The pneumatic cylinder 54 is actuated by means of a pneumatic valve 55. To this end, the pneumatic valve 55 has an electromagnet 56 which acts on the pneumatic valve 55 counter to a pneumatic valve spring 57. Using the pneumatic valve 55, in the illustrated position of FIG. 1, a first pressure space 58 of the pneumatic cylinder 54 is depressurised. When no electrical power is supplied to the electromagnet 56, however, owing to the pneumatic valve spring 57 the pneumatic valve 55 is moved into the second switching position thereof. In the second switching position, a pneumatic pressure is supplied to the first pressure space 58. In the pneumatic cylinder 54, there is arranged a pneumatic valve piston 54' which, owing to this pressure in the first pressure space 58, applies pressure to pressure medium located in a second pressure space 59. The second pressure space 59 is connected to a coupling activation line 60. Furthermore, a return spring is arranged in the second pressure space 59. The pressure produced by the pneumatic cylinder 54 in the coupling activation line 60 is consequently available to activate the coupling 10.

A coupling valve 61 is arranged in the coupling activation line 60. The coupling valve 61 is constructed as a pressure reduction valve. The pressure downstream of the coupling valve 61 is adjusted by means of a coupling valve magnet 62. The coupling valve magnet 62 moves the coupling valve 61 in the direction of the open position thereof. The pressure of the coupling activation line 60 downstream of the coupling valve 61 acts in the opposite direction. By supplying electrical power to the coupling valve magnet 62, the coupling valve 61 is moved into the open position thereof, the downstream pressure being proportional to the pressure at the coupling valve magnet 62. Consequently, the closure force of the coupling 10 can be adjusted. For sensitive coupling and consequently to connect the hydrostatic piston engine 2 to the drive train 9, the closure force of the coupling 10 can be slowly increased by appropriate control of the coupling valve magnet 62. The pressure downstream of the coupling valve 61 in the coupling activation line 60 is supplied to the coupling valve 61 by means of a measuring line 63. It acts at that location counter to the force of the coupling valve magnet 62. If the pressure in the coupling activation line 60 exceeds the value predetermined by the coupling valve magnet 62, the coupling activation line 60 is depressurised into the tank space 7.

The hydrostatic piston engine 2 is preferably adjusted to a small working volume which is not equal to zero in the rest position thereof. As the coupling 10 closes further and the hydrostatic piston engine 2 is consequently driven by the drive train 9, a pressure is therefore produced in the operating line 3 by means of the hydrostatic piston engine 2, although an adjustment of the displacement volume using the adjustment device 11 is not yet possible. This pressure produced by the hydrostatic piston engine 2 is now used for the activation of the coupling. To this end, there is provided a coupling connection line 64, which connects the operating line 3 to the coupling activation line 60.

A first non-return valve 65 is arranged in the coupling connection line 64. The first non-return valve 65 opens in the direction towards the coupling activation line 60. Downstream of the first non-return valve 65, a pressure reduction valve 66 is arranged in the coupling connection line 64. The pressure reduction valve 66 is also constructed so as to be adjustable and is acted on in the direction of the opened position thereof by the force of a spring 68 and an actuator 67. The pressure downstream in the coupling connection line 64 is supplied via an additional measuring line 69 counter to the force of the actuator 67 and the spring 68.

As soon as sufficient pressure is produced by the hydrostatic piston engine 2, therefore, a higher pressure is provided than is possible with the pneumatic cylinder 54, by means of which the closure force of the coupling can also be increased. The coupling activation by the pneumatic cylinder is provided only to allow emergency operation of the coupling 10 and in particular to ensure the closure of the coupling 10 if the system is still in a pressure-free state.

As already mentioned, the hydrostatic piston engine 2 can be adjusted in terms of its working volume. The adjustment device 11 is used for this purpose. The position of the adjustment device 11 is influenced by an adjustment pressure regulation valve 12. The pressure required for this is supplied to both the adjustment pressure regulation valve 12 and a first adjustment pressure chamber 74 of the adjustment device 11 via an adjustment pressure supply line 70.

The adjustment pressure supply line 70 is connected to the outlet of the shuttle valve 23 by means of a second non-return valve 71. As long as sufficient pressure is present either in the hydraulic store 35 or in the operating line 3, it is consequently possible to adjust the hydrostatic piston engine 2 from the neutral position thereof. Using the shuttle valve 23, the higher pressure of the pressure levels in the storage line 4 or the operating line 3 is selected in each case.

This pressure is supplied to a first adjustment pressure chamber 74 by means of the adjustment pressure supply line 70 and a first adjustment pressure line 72. The adjustment device 11 additionally has a second adjustment pressure chamber 75. The first adjustment pressure in the first adjustment pressure chamber 74 and the second adjustment pressure in the second adjustment pressure chamber 75 act on an adjustment piston 76 in opposing directions with a hydraulic force in each case. Owing to the force difference which is produced at both piston faces, the adjustment piston 76 is deflected. The adjustment piston 76 is connected to the adjustment mechanism of the hydrostatic piston engine 2. Consequently, the hydrostatic piston engine 2 is adjusted to a working or displacement volume which corresponds to the position of the adjustment piston 76 of the adjustment device 11. In order to adjust the second adjustment pressure in the second adjustment pressure chamber 74, the second adjustment pressure chamber 74 is connected to the adjustment pressure regulation valve 12 by means of a second adjustment pressure line 73.

The adjustment pressure regulation valve 12 can be acted on in the direction of a first end position by means of a first electromagnet 77. In the opposite direction the adjustment pressure regulation valve 12 can be acted on by means of a second adjustment magnet 78. In the first end position of the adjustment pressure regulation valve 12, the second adjustment pressure line 73 is connected to the tank space 7. In the opposing end position, into which the adjustment pressure regulation valve 12 can be moved by means of the second electromagnet 78, however, the second adjustment pressure line 73 is connected to the adjustment pressure supply line 70. Accordingly, in the second end position of the adjustment pressure regulation valve 12, both in the first adjustment pressure chamber 74 and in the second adjustment pressure chamber 75, the pressure supplied via the adjustment pressure supply line 70 is provided. Owing to the differing piston surface-areas of the adjustment piston 76, the adjustment piston 76 in FIG. 1 moves to the right.

By means of a first centering spring 79 and a second centering spring 80, a deflected adjustment pressure regulation valve 12 is acted on with restoring forces in the direction of the central position thereof illustrated in FIG. 1 when the first and second electromagnets 77 and 78 are in a power-free state. The respective position of the adjustment piston 76 is additionally back-coupled via a coupling device 87 to the adjustment pressure regulation valve 12. As a result, the deflection of the adjustment piston 76 and consequently ultimately the working volume of the hydrostatic piston engine 2 is proportional to the control signal at the first electromagnet 77 or the second electromagnet 78.

In order to prevent cavitations in the hydraulic system, a bypass line 81 is provided. The bypass line 81 connects the tank line 6 to the operating line 3, with the hydrostatic piston engine 2 being bypassed. A non-return valve 82 is provided in the bypass line 81. The non-return valve 82 opens in the direction towards the operating line 3.

Furthermore, there is provided an additional bypass line 83, which bypasses the cooler 48 and the filter 49. Consequently, when a cooler and filter 49 are added, it is possible to discharge pressure medium from the second portion 36" of the operating line branch 36 into the tank space 7. In the additional bypass line 83, a first resiliently loaded non-return valve 84 and a second resiliently loaded non-return valve 85 are provided. Between the two resiliently loaded non-return valves 84 and 85, a third connection line 86 connects the additional bypass line 83 to the operating line branch 36 between the cooler 48 and the filter 49. Owing to the resilient loading of the two non-return valves 84 and 85, it is ensured that the pressure medium is still discharged into the tank space 7 via the filter 49 with only the cooler 48 added. Conversely, with the filter 49 added, the cooler 48 can still be used. The resiliently loaded non-return valves 84 and 85 each open in the direction towards the tank space 7.

The adjustment pressure regulation valve 15 may have an ascending characteristic line or a descending characteristic line. In the case of a descending characteristic line, the control pressure regulation valve 15 is retained in the closed position thereof by means of the control valve spring 17. As the signal at the control magnet 18 increases, however, the control pressure regulation valve is moved in the direction of the open position thereof. The switching valve 16 can then be dispensed with. In order to separate the control pressure line 21 from the tank space 7, therefore, in the case of a control pressure regulation valve 15 with an ascending characteristic line, as shown in the embodiment illustrated, a switching valve 16 is required upstream of the control pressure regulation valve 15. In the case of an ascending characteristic line of the control pressure regulation valve 15, the valve is in the closed position thereof when electrical power is supplied to the control magnet 18.

When establishing the control signal for the control magnet 18, a pressure loss in the line elements is preferably taken into account. This pressure loss may also be dependent in particular on the viscosity of the pressure medium and consequently ultimately on the temperature of the pressure medium. Using a temperature sensor in the tank space 7, the pressure loss can be taken into account in a temperature-dependent manner. The control of the volume flow rate and the control of the control magnet 18 are preferably carried out even during the closure of the coupling 10. Consequently, in addition to the braking torque which is produced by the start-up of the hydrostatic piston engine 2 owing to the closure of the coupling 10, the magnitude of this braking torque can be influenced.

Owing to the additional seat valve 37 in combination with the storage pressure limitation valve 39, a pressure increase in the system caused by a temperature increase owing to external influences, such as, for example, sunshine, can further be compensated for. Increasing pressure which is brought about by such a temperature increase is relieved by opening the storage pressure limitation valve 39 and the associated depressurisation and reduction of the additional control pressure in the additional control pressure line 38. Owing to the control pressure reduction, the additional seat valve 37 opens and depressurises the operating line 3 via the operating line branch 36. Before the individual driving situations and the control of the device 1 according to the invention are discussed in detail, the construction of the electronic control system with its significant elements is first intended to be described.

In order to be able to establish the braking or acceleration elements which can be produced with the device 1, using a control line sensor 34 and an additional control line sensor 50, the pressures in the control lines 22 and 38 are measured and, using a storage pressure sensor, the pressure in the hydraulic store 35 is measured and, using an operating line branch sensor 52, the pressure in the first portion 36' of the operating line branch 36 is measured. The sensors 34, 50, 51 and 52 are connected to an electronic control system whose construction will be explained below.

Figure 2:
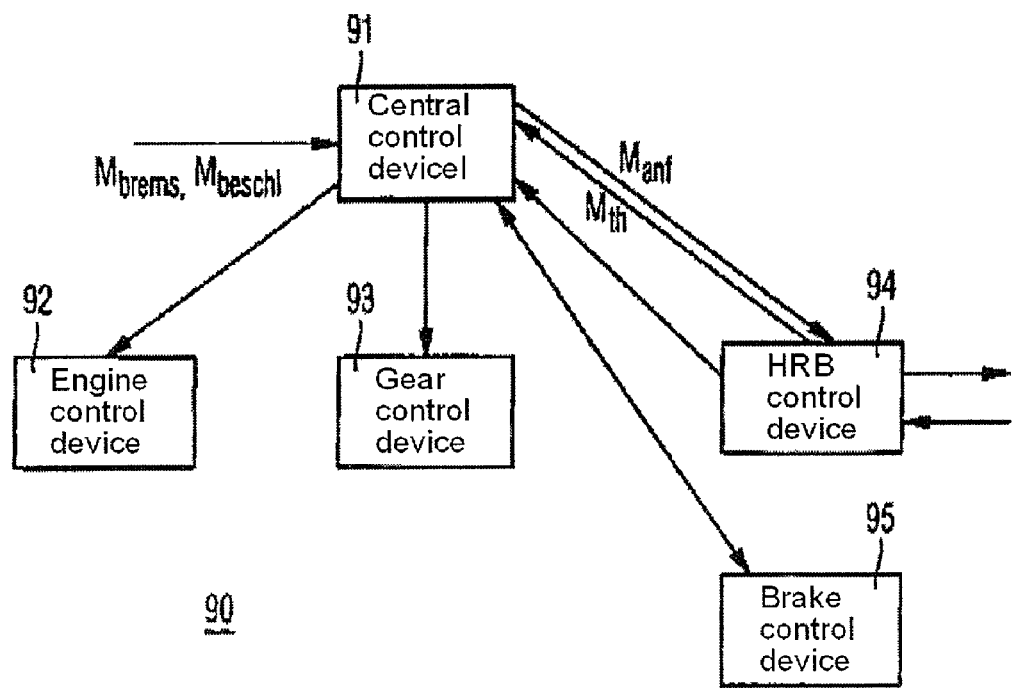
FIG. 2 is a block diagram of an electronic control system for controlling the device of FIG. 1.

FIG. 2 schematically illustrates an electronic control system 90. The electronic control system 90 comprises a central control device 91. The central control device 91 is connected for the exchange of information to an engine control device 92, a gear mechanism control device 93, an energy recovery control device 94 and a brake control device 95. In the embodiment illustrated in FIG. 2, the energy recovery control device 94 transmits to the central control device 91 the torques that can be produced both for the braking and for the acceleration using the energy recovery device which is extensively explained in FIG. 1. Conversely, the central control device 91 transmits to the energy recovery control device 94 the torques that are currently required to achieve a specific travel situation or how large the proportion is that is taken over by the device 1.

For example, a specific braking action is produced by a braking torque. The braking action $M_{brems}$ which is predetermined by an operator, for example, by means of a brake pedal, is read by the central control device 91. The required torque $M_{anf}$ corresponding to the desired braking action is transmitted to the energy recovery control device 94. As long as this request can be implemented by the device 1 of FIG. 1, corresponding control signals for the coupling valve 83, the control pressure regulation valve 15 and optionally the pneumatic valve 55 are produced and transmitted. In order to establish whether a required torque can be produced, various parameters of the device 1 are read by the energy recovery control device 94. In particular, a speed $n_{Getaus}$ of the drive train 9, a speed $n_{pumpe}$ of the hydrostatic piston engine 2 and the storage pressure $p_{sp}$ and the pump pressure $p_p$ produced by the hydrostatic piston engine 2 are established. In addition, it is preferably also possible to establish the temperature $T_{öl}$ of the pressure medium and a characteristic value with respect to the flow resistance. Based on these measured values of the hydraulic system, the control values for the switching valve 16, the control pressure regulation valve 15 and the additional switching valve 45 are established. At the same time, a working volume of the hydrostatic piston engine 2 required in order to achieve the required rotational torque both for a braking operation and for an acceleration operation is established. In the event of a change in the travel situation which makes it necessary for the energy recovery device to be switched on or off, the required activation pressure for the coupling 10 is further established. In order to be able to adjust this required activation pressure, the adjustment values for both the coupling valve 55 and the coupling valve 61 are established by the energy recovery control device 94.

With the configuration of an electronic control system 9 illustrated in FIG. 2, the torques both for a braking operation $M_{brems}$ and for an acceleration operation $M_{beschl}$, as predetermined by a vehicle operator, are read by the central control device 91. The torques for a braking operation $M_{brems}$ and for an acceleration operation $M_{beschl}$ are predetermined, for example, by means of a throttle lever or a braking pedal, by means of an operator.

Figure 3:
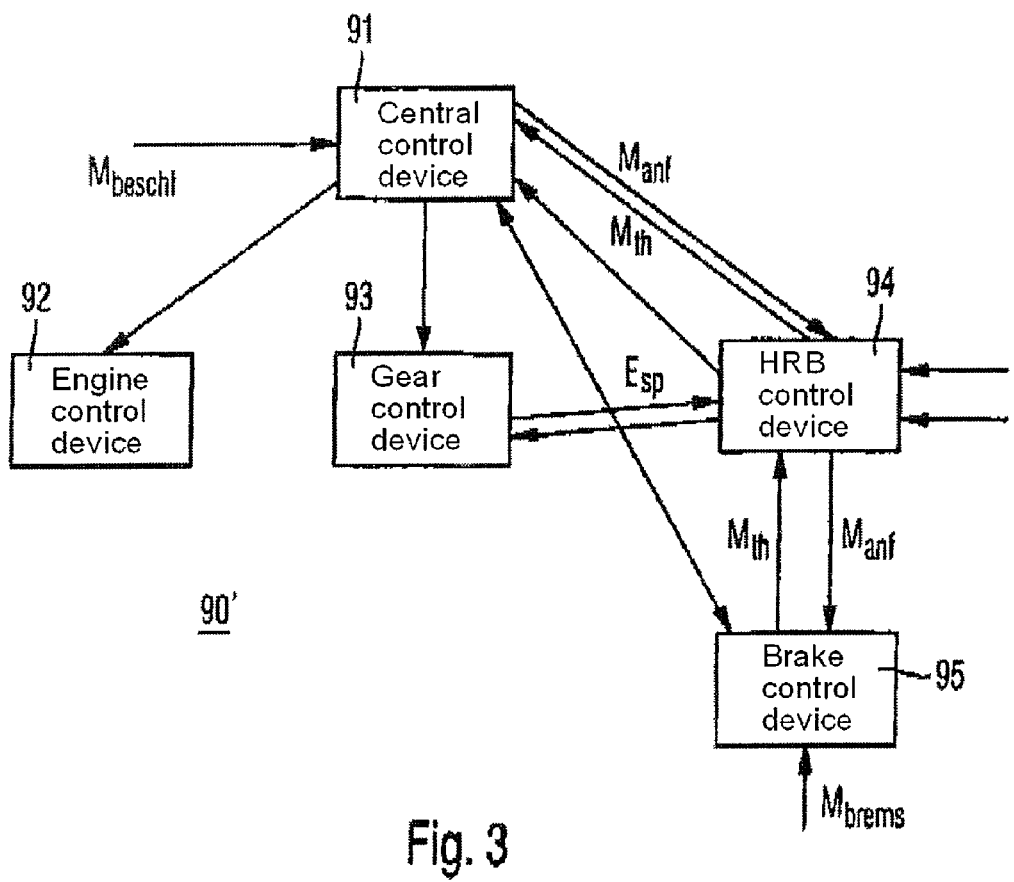
FIG. 3 is a second block diagram of an electronic control system to illustrate a control of the valves of the device according to FIG. 1.

In contrast, with the decentralised embodiment of an electronic control system 90', as illustrated in FIG. 3, only the acceleration torque $M_{beschl}$ is read by the central control device 91. To this end, the central control device 91 is connected to a throttle lever, for example, by means of a vehicle-internal bus. However, a braking torque instruction $M_{brems}$ is transmitted to the braking control device 95 by means of a brake pedal. The communication between the brake control device 95 and the energy recovery control device 94 is carried out directly, as illustrated in FIG. 3 by the illustrated connection arrows between the brake control device 95 and the energy recovery control device 94. There is also direct communication between the gear mechanism control device 93 and the energy recovery control device 94.

The operation in the individual operating states of a travel drive will be explained once again below. In order to be able to use the device 1 according to the invention, it is first necessary to couple the hydrostatic piston engine 2 to a drive train 9. This is carried out by means of the coupling 10 which is constructed, for example, as a multi-disc coupling. The activation which has already been described via a pressure which is produced by means of the pneumatic cylinder 54 constitutes an emergency pressure supply. If the hydraulic store 35 is empty and no conveying pressure is produced by the hydrostatic piston engine 2, it is possible to activate the coupling 10 using this emergency pressure supply.

The device 1 described is preferably used in vehicles which have intensive travel cycles. With such vehicles, a braking operation and an acceleration operation are often carried out in very close succession. Such vehicles are, for example, refuse collection vehicles. In this instance, the vehicles are particularly advantageously provided with an accelerator pedal or a throttle lever which produces a braking torque when not activated below a specific speed. This limit speed $V_{Betrieb}$ can be adjusted by the operator, for example, by means of an input device.

During a normal travel operation, no electrical power is supplied to any of the valves. The piston 54' of the pneumatic cylinder 54 is in its position defined by a spring in the second pressure space 59. The hydrostatic engine is in the rest position thereof and is at the minimum working volume thereof which is not equal to zero. The seat valve 5 is closed. The pressure of the hydraulic store 35 supplied to the control pressure line 22 via the shuttle valve 23 acts in the same direction as the valve spring 33 on the piston of the seat valve 5 and retains it in the closed position thereof. The coupling 10 is open. The additional seat valve 37 is also closed.

If a braking operation is now initiated by activating a brake pedal or by releasing the accelerator pedal described above, a braking torque is requested by the electronic control system 90, 90'. Firstly, the speed between the drive shaft 8 and the drive train 9 is equalised. To this end, the coupling 10 is closed by controlling the coupling valve magnet 62. Depending on the control signal supplied to the coupling valve magnet 62, a coupling pressure which acts on the coupling 10 is adjusted. This coupling pressure consequently ultimately determines the closure force and consequently the transferable torque of the coupling 10. Owing to the closure of the coupling 10, a first detectable braking torque is consequently produced. The hydrostatic piston engine 2 is accelerated and, owing to its adjusted minimum supply volume, a volume flow rate is produced in the operating line 3. As the pressure in the operating line 3 increases, this pressure is also supplied to the coupling activation line 60 by means of the pressure reduction valve 66. The pneumatic cylinder 54 which is optionally activated is returned to the initial position thereof and the higher operating line pressure of the operating line 3 is available for controlling the coupling 10. As the speed compensation between the drive shaft 8 and the drive train 9 increases, the closure pressure at the coupling 10 is increased so that relatively high torques can also be transmitted.

Following or even during the closure of the coupling 10, the working volume of the hydrostatic piston engine 2, that is to say, the supply volume of the hydrostatic piston engine 2 during pump operation, is increased. Consequently, the braking torque is increased. The pivoting of the hydrostatic piston engine 2 is preferably already carried out during the closure of the coupling 10. The hydrostatic piston engine 2 is connected to the hydraulic store 35 by the switching valve 16 first being brought into the through-flow position thereof. To this end, the control magnet 18 of the control pressure regulation valve 15 is supplied with electrical power in order to reduce the control pressure in the control pressure line 22 and consequently to move the seat valve 5 in the direction of the open position thereof. The hydrostatic piston engine 2 consequently conveys the pressure medium into the hydraulic store 35. The braking torque which can be set out is:

$$\frac{E_{sp}V_{g,hM}}{2\pi} \qquad (\text{eq. 1})$$

with $E_{sp}$ being the pressure in the hydraulic store 35 and $V_{g,hM}$ being the supply volume of the hydrostatic piston engine 2 which is operated as a pump.

When adjusting the supply volume of the hydrostatic piston engine 2, the volume-flow-dependent pressure drops in the fittings and line of the device 1 are also preferably taken into consideration. The hydraulic/mechanical performance of the pump is also taken into account. A further increase of the braking torque is possible by controlling the control pressure regulation valve 15 into an intermediate throttling position. The control pressure regulation valve 15 is controlled in such a manner that the seat valve 5 is moved into a throttling position. The maximum braking torque that can be produced in this manner is almost independent of the pressure in the hydraulic store 35.

If the vehicle is brought to a stop, the braking torque is reduced below a specific second limit speed prior to stopping. This can be carried out on the one hand by opening the seat valve 5 and on the other hand by cancelling the adjusted supply volume of the hydrostatic piston engine 2. In the case of vehicles with intensive travel cycles, the coupling 10 is generally still in the closed position thereof when the vehicle is brought to a stop. If the coupling 10 is not in the closed position thereof, however, the coupling is first moved into the closed position thereof before an acceleration operation can be carried out.

The acceleration torque that can be produced is transmitted to the central control device 91 above a minimum storage pressure $p_{min}$. In order to accelerate the vehicle from the hydraulic store 35, the control pressure regulation valve 15 is moved into the open position thereof so that the seat valve 5 also moves into the open position thereof. The acceleration torque is determined by adjusting a corresponding working volume of the hydrostatic piston engine 2 which now operates as a motor. Owing to the electronic control system 90, 90', the drive motor of the vehicle is also adapted in accordance with the acceleration torque provided by the device 1. To this end, the engine control device 92 takes into account, for example, the acceleration torque produced by the device 1.

Owing to the emptying of the hydraulic store 35, the acceleration torque that can be produced is also reduced. If the pressure in the hydraulic store 35 falls below a minimum level owing to an acceleration from the store 5, the acceleration torque that can be produced by the device 1 and is transmitted back to the central control device 91 is reduced by the energy recovery control device 34. In accordance with this reduced possible acceleration torque, the torque produced by the drive engine which is generally configured as a diesel internal-combustion engine is increased. Consequently, the internal-combustion engine is able to gently receive the entire drive torque. Subsequently, the coupling 10 is opened by resetting the control signal of the coupling valve magnet 62. After opening the coupling 10, the seat valve 5 is returned to the closed position thereof.

As a safety device, the hydraulic store 35 is emptied following a definable period of time after the vehicle has been switched off. The hydraulic store 35 is emptied by means of the seat valve 5 and the additional seat valve 37. By supplying appropriate electrical power to the control magnet 18, the seat valve 5 is moved into a throttling position in order to allow controlled discharging of the hydraulic store 35. The depressurisation of the additional seat valve 37 is in contrast carried out via the additional switching magnet 45. To this end, the additional switching magnet 47 is supplied with electrical power and consequently the additional seat valve 37 is moved into the completely open position thereof. If an inadmissible temperature increase is detected by the temperature sensor in the tank space 7, the braking action produced by the energy recovery device can be reduced, even during normal braking operation. In addition, the cooling circuit can be switched on.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An energy recovery device comprising:
   a hydrostatic engine;
   at least one hydraulic store configured to be connectable to the hydrostatic engine via an operating line; and
   a valve device that influences a volume flow rate in the operating line between the hydraulic store and the hydrostatic engine, the valve device comprising a brake pressure regulation valve unit having a valve and a pilot valve unit, the pilot valve unit being configured to adjust a control pressure that acts on the valve.

2. The energy recovery device according to claim 1, wherein the valve device further comprises a discharge valve unit that has an additional valve in an operating line branch, which connects the operating line to a tank space, the additional valve being acted on with an additional control pressure.

3. The energy recovery device according to claim 2, wherein a cooler is arranged in the operating line branch.

4. The energy recovery device according to claim 2, wherein, in order to supply the additional control pressure, the additional valve is connectable to an additional control pressure line, and wherein the additional control pressure line is connectable to the tank space via a storage pressure limitation valve.

5. The energy recovery device according to claim 2, wherein, in order to supply the additional control pressure, the additional valve is connectable to an additional control pressure line, and wherein the additional control pressure line is connectable to the tank space via a switching valve.

6. The energy recovery device according to claim 1, wherein the valve for supplying the control pressure is connectable to a control pressure line, and wherein the pilot valve unit has at least one control pressure regulation valve via which the control pressure line is connectable to a tank space.

7. The energy recovery device according to claim 6, wherein the pilot valve unit further comprises a switching valve via which the control pressure regulation valve is adapted to be separated from the control pressure line.

8. The energy recovery device according to claim 1, wherein the pilot valve unit and/or the switching valve is controllable by an electronic control system.

9. The energy recovery device according to claim 8, further comprising sensors configured to establish the control pressure and/or an additional control pressure and/or a pressure in the operating line branch and are connected to the electronic control system.

10. The energy recovery device according to claim 2, further comprising a temperature sensor for establishing a temperature in the tank space.

11. The energy recovery device according to 1, wherein the hydrostatic engine is connectable to a coupling and is connectable to a drive train by the coupling.

12. The energy recovery device according to claim 1, wherein the hydrostatic engine is an adjustable hydrostatic piston engine, which, in a neutral position thereof, is adjusted to a working volume that is not equal to zero.

13. The energy recovery device according to claim 2, wherein the valve and/or the additional valve is configured as a seat valve.

14. The energy recovery device according to claim 1, wherein the pilot valve unit is configured to adjust the control pressure in a closed direction.

15. The energy recovery device according to claim 1, wherein the valve is provided between a connection of the operating line to a storage line which opens in the hydraulic store.

16. The energy recovery device according to claim 1, wherein the valve is controllable with the adjustable control pressure to produce a throttled connection between the operating line and the storage line.

17. The energy recovery device according to claim 1, wherein the valve is adjustable in a stepless manner between a completely closed position and an unthrottled connection of the operating line to the storage line in case the hydrostatic engine is operated as a pump during a braking operation.

18. A method for controlling a device for recovering kinetic energy having a hydrostatic engine, a hydraulic store that is connectable to the hydrostatic engine via an operating line, and a valve device that influences a volume flow rate in the operating line, the valve device having a valve that is acted on with a control pressure via a pilot valve unit, the method comprising:
  establishing a required braking torque via an electronic control system;
  increasing a supply volume of the hydrostatic piston engine into the operating line; and
  controlling the pilot valve unit via the electronic control system so that the valve is moved in a direction of an open position thereof.

19. The method according to claim 18, wherein, in order to increase a braking action, the valve is moved into a throttling position.

20. The method according to claim 18, wherein, when the hydraulic store is fully charged, an additional valve is moved into an open position and a pressure medium is conveyed by the hydrostatic engine into a tank space via the additional valve.

21. The method according to claim 20, wherein, in order to cool a pressure medium, the additional valve is moved into an open, unthrottled position and the pressure medium is conveyed into the tank space via an open additional valve and a cooler.

22. The method according to claim 18, wherein the valve is provided between a connection of the operating line to a storage line which opens in the hydraulic store.

23. The method according to claim 18, wherein in order to increase a braking action, the valve is moved into a throttling position to produce a throttled connection between the operating line and the storage line according to the adjustable control pressure.

24. The method according to claim 18, wherein the valve is adjusted in a stepless manner between a completely closed position and an unthrottled connection of the operating line to the storage line in case the hydrostatic engine is operated as a pump during the braking operation.

25. An energy recovery device comprising:
  a hydrostatic engine;
  at least one hydraulic store configured to be connectable to the hydrostatic engine via an operating line; and
  a valve device that influences a volume flow rate in the operating line between the hydraulic store and the hydrostatic engine,
  wherein the valve device comprises a brake pressure regulation valve unit having a valve and a pilot valve unit, the pilot valve unit being configured to adjust a control pressure that acts on the valve in a closed direction,
  wherein the valve is provided between a connection of the operating line to a storage line which opens in the hydraulic store,
  wherein the valve is controllable with the adjustable control pressure to produce a throttled connection between the operating line and the storage line, and
  wherein the valve is adjustable in a stepless manner between a completely closed position and an unthrottled connection of the operating line to the storage line in case the hydrostatic engine is operated as a pump during a braking operation.

* * * * *